United States Patent [19]

Tsuyama et al.

[11] Patent Number: 5,320,422
[45] Date of Patent: Jun. 14, 1994

[54] SLIP CONTROL DEVICE FOR VEHICLE WHEEL

[75] Inventors: Toshiaki Tsuyama, Higashi-Hiroshima; Fumio Kageyama, Hiroshima; Kazutoshi Nobumoto, Hiroshima; Makoto Kawamura, Hiroshima; Haruki Okazaki, Hiroshima, all of Japan

[73] Assignee: Mazda Motor Corporation, Hiroshima, Japan

[21] Appl. No.: 118,088

[22] Filed: Sep. 7, 1993

Related U.S. Application Data

[63] Continuation of Ser. No. 834,207, Feb. 12, 1992, abandoned.

[30] Foreign Application Priority Data

Feb. 14, 1991 [JP] Japan .................. 3-042899

[51] Int. Cl.⁵ .................. B60T 8/58; B60K 28/16
[52] U.S. Cl. .................. 303/110; 180/197; 303/113.2; 364/426.03
[58] Field of Search .................. 180/197; 303/113.2, 303/113.3, 103, 110, 111; 364/426.01–426.03

[56] References Cited

U.S. PATENT DOCUMENTS

| | | | |
|---|---|---|---|
| 4,416,347 | 11/1983 | Bertling et al. | 180/197 |
| 4,626,040 | 12/1986 | Ogino | 180/197 X |
| 4,762,196 | 8/1988 | Harada et al. | 180/197 |
| 4,866,623 | 9/1989 | Ise et al. | 180/197 X |
| 4,884,651 | 12/1989 | Haroda et al. | 180/197 |
| 4,955,448 | 9/1990 | Ise et al. | 180/197 |
| 4,970,650 | 11/1990 | Hashiguchi et al. | 303/103 X |
| 4,971,164 | 11/1990 | Fujita et al. | 180/197 |
| 4,999,778 | 3/1991 | Ruhl et al. | 180/197 X |
| 5,000,281 | 3/1991 | Nobumoto et al. | 180/197 |
| 5,009,294 | 4/1991 | Ghoneim | 364/426.03 X |
| 5,033,002 | 7/1991 | Sol | 180/197 X |
| 5,070,461 | 12/1991 | Nobumoto et al. | 303/103 X |
| 5,083,631 | 1/1992 | Nakayama et al. | 364/426.03 X |

FOREIGN PATENT DOCUMENTS 62-149545 7/1987 Japan .

*Primary Examiner*—Douglas C. Butler
*Assistant Examiner*—Alfred Muratori
*Attorney, Agent, or Firm*—Keck, Mahin & Cate

[57] ABSTRACT

A slip control device includes a slip detecting device for detecting a slip rate of a drive wheel, an engine control device for reducing an engine output when the slip rate exceeds a first threshold value, and a brake control device for applying a brake force on the drive wheel when the slip rate exceeds a second threshold value. A frictional coefficient detecting device detects a frictional coefficient of a road, on which the vehicle is running, and a threshold determining device provides the first and second threshold values in accordance with the frictional coefficient. The engine output control and brake force control can be effectively utilized for the slip control in the traction control.

10 Claims, 3 Drawing Sheets

SLIP CONTROL DEVICE FOR VEHICLE WHEEL

This is a continuation of application Ser. No. 07/834,207, filed Feb. 12, 1992, now abandoned.

BACKGROUND OF THE INVENTION

1. Field of the Invention

The present invention relates to a slip control in a traction control system for a vehicle which reduces the torque of the drive wheels of a vehicle when an undue slip rate is produced in the drive wheels so that the drive torque is transmitted with high efficiency.

2. Description of the Prior Art

In recent years, there has been proposed a traction control system which reduces the drive torque transmitted to the drive wheels for preventing the acceleration property from being deteriorated when the drive wheels are in a substantial slip condition.

In Japanese Patent Public disclosure (JP A) No. 62-49545, laid open to the public in 1987, the slip control system judges whether or not the slip rate of drive wheels against the load surface is greater than a predetermined value. If the slip rate is smaller than the predetermined value, the slip control system reduces the engine output to eliminate the slip condition. When the slip rate is greater than the predetermined value, the slip control system adjusts the brake force acting on the drive wheels in order to suppress an excessive drive force to the drive wheels to thereby eliminate the slip condition.

According to the above slip control system, it is advantageous that when the vehicle is in a slip condition where the slip level of the drive wheels is relatively low or small, the slip condition is dealt with merely through engine output control. Thus, the burden of the brake system of the vehicle can be eased It should, however, be noted that the slip control makes the driver feel an under-power of the engine output.

SUMMARY OF THE INVENTION

An object of the present invention is therefore to provide a slip control device which enables the vehicle to make a powerful drive by restricting undesirable output reduction of the engine when the vehicle runs on a high friction path such as a pavement. This is because a frictional coefficient between a wheel tire and a road surface is high.

The above object can be accomplished by providing a slip control device comprising slip detecting means for detecting a slip rate of a drive wheel, engine control means for reducing an engine output when the slip rate exceeds a first threshold value, brake control means for applying a brake force on the drive wheel when the slip rate exceeds a second threshold value, frictional coefficient detecting means for detecting a frictional coefficient of road on which the vehicle is running, and threshold determining means for providing the first and second threshold values in accordance with the frictional coefficient.

In a preferred embodiment, the threshold determining means provides the first threshold value with a greater value than the second threshold value when the frictional coefficient is greater than a predetermined value. The threshold determining means may provide the first threshold value with a smaller value than the second threshold value when the frictional coefficient is smaller than a predetermined value.

In another feature, the threshold determining means provides the first threshold value with a greater value than the second threshold value when the frictional coefficient is greater than a predetermined value, whereas it provides the first threshold value with a smaller value than the second threshold value when the frictional coefficient is smaller than the predetermined value.

Preferably, the engine control means controls the engine output to accomplish the first threshold value as a target value by a feedback control of a sub-throttle valve.

The brake control means controls the engine output to accomplish the second threshold value as a target value by a feedback control of a hydraulic pressure in a brake system for the drive wheel through a duty control of solenoid valve in a hydraulic control system.

In still another aspect, a slip control device includes slip detecting means for detecting a slip rate of a drive wheel, engine control means for reducing an engine output when the slip rate exceeds a first threshold value, brake control means for applying a brake force on the drive wheel when the slip rate exceeds a second threshold value, vehicle speed detecting means for detecting a vehicle speed, and threshold determining means for providing the first and second threshold values in accordance with the vehicle speed In a preferred embodiment, the threshold determining means provides the first threshold value with a greater value than the second threshold value when the vehicle speed is greater than a predetermined value.

In another embodiment, the threshold determining means provides the first threshold value with a smaller value than the second threshold value when the vehicle speed is smaller than a predetermined value.

The threshold determining means may provide the first threshold value with a greater value than the second threshold value when the vehicle speed is greater than a predetermined value, and the first threshold value with a smaller value than the second threshold value when the vehicle speed is smaller than the predetermined value.

According to the present invention, when the frictional coefficient is greater than the predetermined value, the first threshold value for the engine output control is set at a greater value than the second threshold value for the brake force control. As a result, when the slip rate of the drive wheel occurs, a braking operation is applied on the drive wheel to reduce the drive force at first. Therefore, the engine can be operated without reducing the engine output during the slip control.

According to another aspect of the present invention, when the vehicle speed is greater than the predetermined value, the first threshold value is set at a greater value than the second threshold value. On a high friction road where the frictional coefficient between a wheel tire and the road surface is relatively high, a critical vehicle speed or the maximum speed at which the vehicle can run without producing a substantial slip rate against the road surface is increased as compared with a low friction road where the frictional coefficient between a wheel tire and the road surface is relatively low. Therefore, the more power of the engine is likely needed, the greater frictional coefficient is provided. According to the present invention, any reduction of the engine output resulting from the slip control can be avoided during a high speed operation in the high friction road.

On the other hand, when the vehicle runs on the low friction road, the first threshold value is set at a smaller value than the second threshold value so that the engine output is reduced prior to the brake force control when a substantial slip rate is detected for the first time. As a result, the brake device can maintain a desirable braking effect without being worn out because the braking control is suppressed for the slip control.

Further objects, features, and advantages of the present invention will become apparent from the Detailed Description of the Preferred Embodiment which follows, when considered together with the attached drawings.

DESCRIPTION OF THE PREFERRED EMBODIMENT

Figure 1:
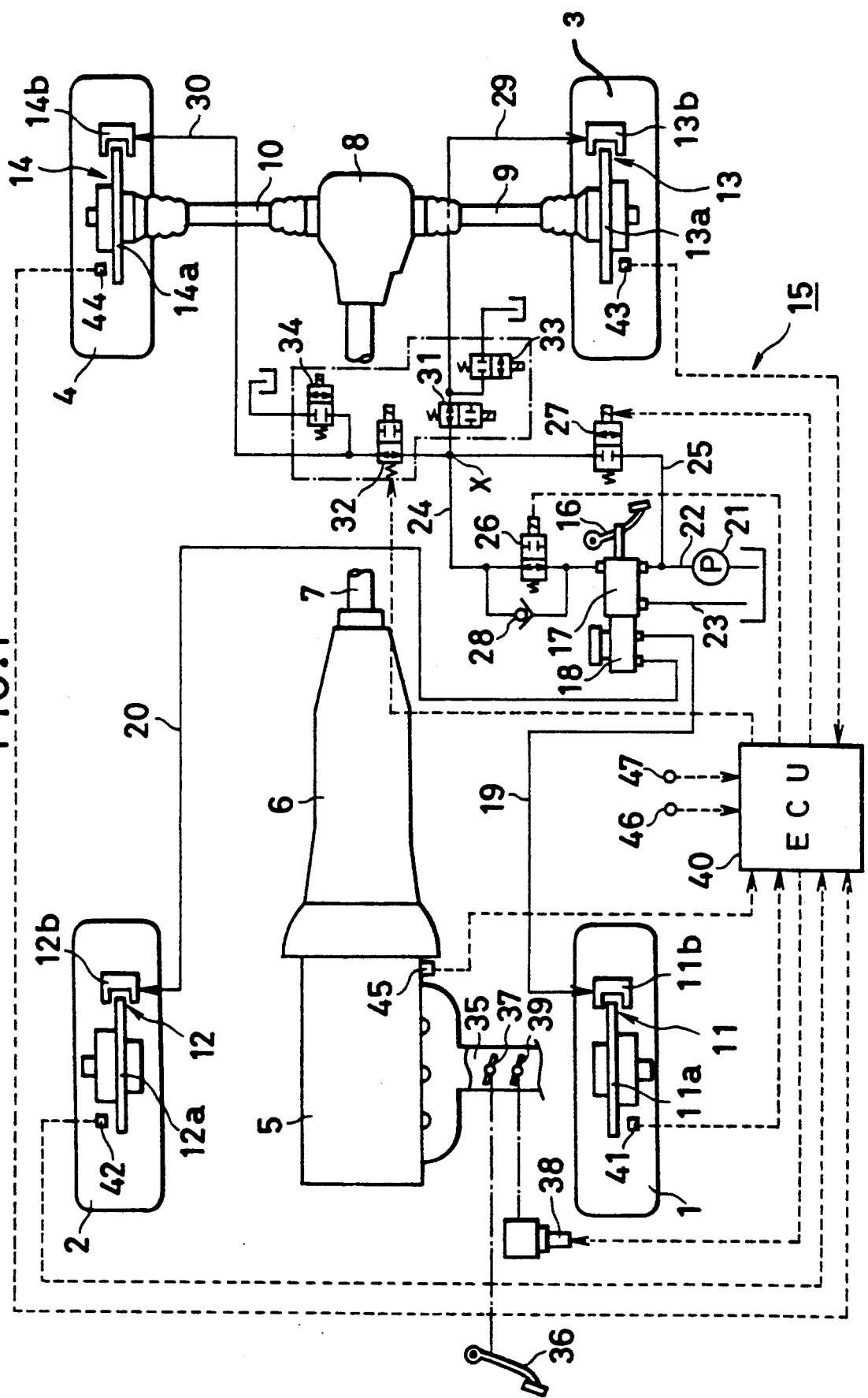
FIG. 1 is a schematic view of a slip control device in accordance with one embodiment of the present invention.

Referring to FIG. 1, a vehicle is provided with left and right front wheels 1, 2 which are passive wheels and the left and right rear wheels 3, 4 which are drive wheels. The torque produced by the engine 5 mounted in the front of the vehicle, after passing through the automatic transmission 6, the propeller shaft 7, and the differential gear 8, is transmitted to the left rear wheel 3 by left drive axle 9, on the one hand, and transmitted to right rear wheel 4 by right drive axle 10.

The wheels 1 through 4 are provided with brake devices 11 through 14, including discs 11a through 14a integrally rotating with the wheels 1 through 4 and calipers 11b through 14b controlling the discs 11a through 14a, and with brake control system 15.

The brake system 15 is provided with a hydraulic booster 17 for multiplying the treading force on the brake pedal 16, and a master cylinder 18 for producing a brake force in response to the treading force multiplied by the booster 17.

Brake lines 19, 20 from the master cylinder 18 are connected with the calipers 11b and 12b of the brake devices 11 and 12 so that the brake force in response to the treading force of the brake pedal 16 is introduced directly into the brake devices 11, 12 to control the front wheels 1 and 2.

The booster 17 is connected with the pressure supply line 22 for supplying a working pressure from pump 21 and return line 23 for returning an excessive brake fluid from the booster 17 to a reservoir tank. First and second solenoid valves 26, 27 are disposed on first and second brake lines 24, 25. On the first brake line 24 is disposed check valve 28 juxtaposed with the first solenoid valve 26 so as to prevent a reverse flow.

The first and second brake lines 24 and 25 are merged at point X where brake lines 29 and 30 for rear wheels are extended and connected with the calipers 13b and 14b of the brake devices 13 and 14. On the lines 29 and 30 are disposed solenoid valves 31, 32 and relief valves 33, 34.

On intake passage 35 are disposed a main throttle valve 37 connected with acceleration pedal 36, sub-throttle valve 39 connected with actuator 38. The engine output is controlled by adjusting the main throttle valve and the subthrottle valve 37, 39.

There is provided an electronic control unit 40 (hereinafter referred to as ECU) for carrying out the traction control. The ECU 40 receives signals from wheel speed sensors 41-44 for detecting the rotation speed of the wheels 1-4, engine speed sensor 45 for detecting the engine speed, first throttle sensor 46 for detecting the opening of the main throttle valve 37, second throttle sensor 47 for detecting the opening of the sub-throttle valve 39 so as to control operations of solenoid valves 26, 27, 31 and 32, relief valves 33, 34 and the actuator 38 for adjusting the opening of the sub-throttle valve 39. A control signal from the ECU 40 opens the first solenoid valve 26 on the first supply line 24 and closes the second solenoid valve 27 on the second supply line 25. In this case, when the solenoid valves 31 and 32 on the brake lines 29 and 30 for the rear wheels, a brake force in response to the treading force of the brake pedal 16 produced by the booster 17 is applied to the brake devices 13 and 14 to control the rear wheels 3 and 4.

On the other hand, the ECU 40, when making the traction control, closes the first solenoid valve 26 and opens the second solenoid valve 27. Therefore, the working pressure produced in the pump 21 is applied to the brake lines 29 and 30 as the brake pressure without being intervened by the booster 17.

When a slip rate of the rear wheels 3, 4 from the wheel speed sensors 41-44 is detected, in other words, when the wheel speed of the rear wheels 3, 4 (drive wheels) is detected to be greater than the wheel speed of the front wheels 1, 2 (passive wheels), the brake force is provided for the rear wheels 3, 4 in accordance with the level of the slip rate by carrying out the duty control for the solenoid valves 31, 32 and relief valves 33, 34. The slip rate can be obtained based on a difference in the wheel speed between the drive wheels (rear wheels) and the passive wheels (front wheels).

Explaining the traction control briefly, the ECU 40 calculates the acceleration of the vehicle based on the passive wheel speed detected by the wheel speed sensors 41 and 42 and next calculates the frictional coefficient $\mu$ based on the acceleration and the vehicle speed represented by the passive wheel speed.

Next, the ECU 40 reads out respective target values of the slip rate for engine out control and brake force control in light of a map in which the target slip values are stored in connection with the frictional coefficient $\mu$ as a parameter. Then, the ECU 40 obtains the final target slip rates for the engine output control and the brake force control $S_E$ and $S_B$. When the amount of the slip rate S exceeds the target value $S_E$ obtained based on the passive and drive wheel speed in the case where the target slip rate $S_E$ for the engine output control is set at a smaller value than the target slip rate $S_B$, the ECU 40 starts the traction control by controlling the engine output. In this control, the ECU 40 applies a feedback control on the opening the sub-throttle valve 39 through the control of the actuator 38 based on the second throttle sensor 47 so as to accomplish the target slip rate $S_E$. As a result, the output of the engine is reduced to accomplish the target value $S_E$.

In starting the control for the engine output, the second solenoid valve 27 on the second brake line 25 is closed and the solenoid valves 31 and 32 on the lines 29 and 30 are closed As a result, when the solenoid valves 31 and 32 are opened for the brake force control, the hydraulic pressure can be quickly introduced into the brake devices 13, 14 to obtain a fine responsiveness.

When the slip rate S continues to increase regardless of the engine output control and exceeds the target value $S_B$ for the brake force control, the hydraulic pressure is introduced into the brake devices 13 and 14 for the rear wheels 3 and 4 so that the traction control is carried out by both the engine output control and the brake force control. In this control, the brake force is controlled to accomplish the target value $S_B$ through a feedback control.

Figure 2:
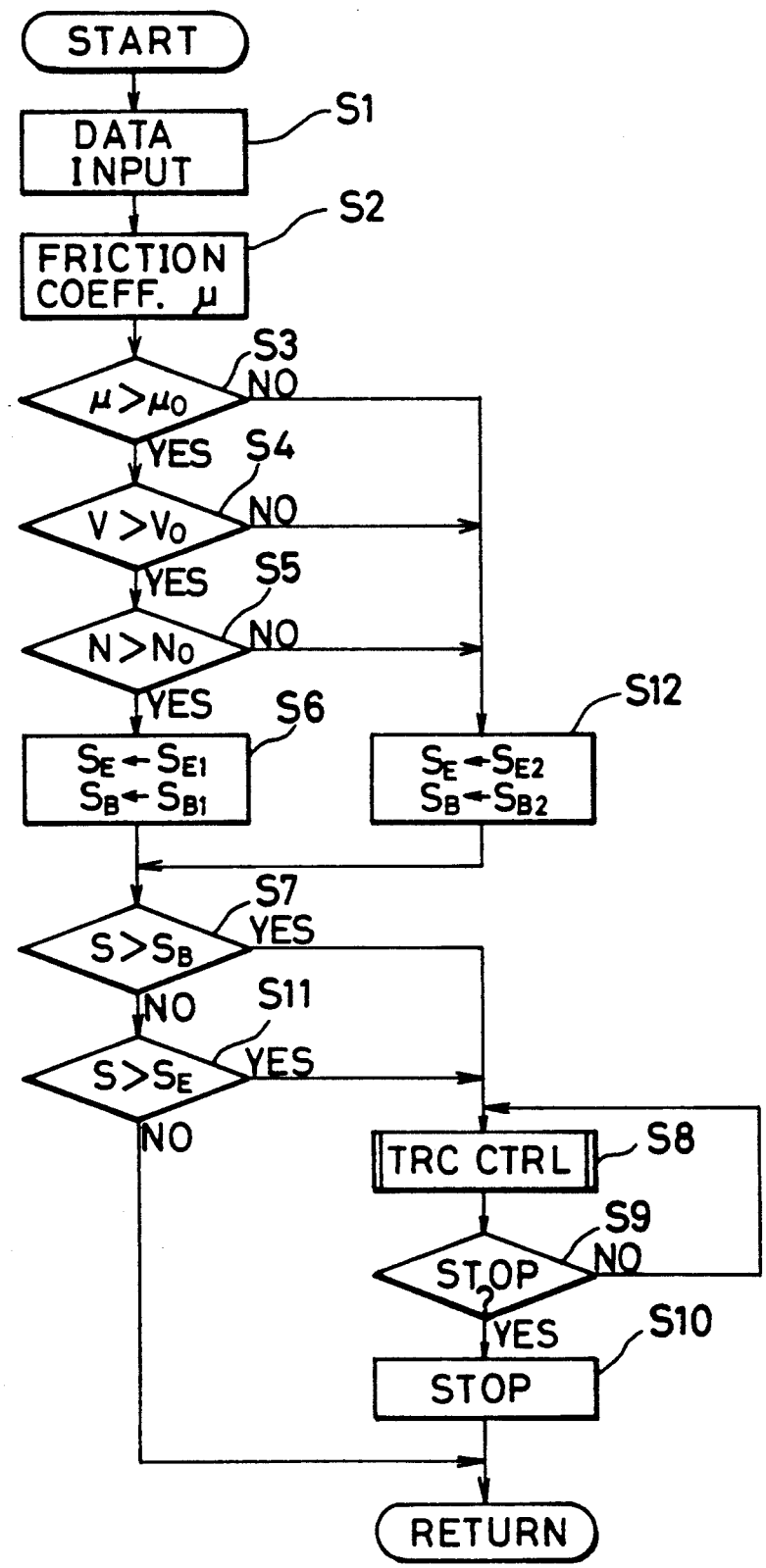
FIG. 2 is a flow chart showing the control elements of one embodiment of the present invention.

When the slip rate S of the rear wheels 3, 4 is reduced to the target value $S_B$, the brake force is reduced so that the brake force control as the traction control is stopped. However, the engine output control is continued until conditions for stopping the engine output control are satisfied. When the main throttle valve is completely closed or when the actual slip rate S converges to a target value of the two values $S_E$ and $S_B$, whichever is smaller, the ECU 40 judges that the conditions for stopping the engine output control is satisfied. Thus, the slip condition of the rear wheel is eliminated. Next, there is described a control by the ECU 40 in accordance with flow chart shown by FIG. 2.

The ECU 40 reads various data in step S1. In step S2, the ECU 40 calculates the frictional coefficient $\mu$. The frictional coefficient $\mu$ between the wheel and the road surface can be obtained, for example, through the same procedure as disclosed in U.S. Pat. No. 4,951,198, which is as signed to the same assignee as the present invention. The disclosure of the U.S. Pat. No. 4,951,198 is incorporated herein by reference.

In the illustrated embodiment, the CU compensates the frictional coefficient $\mu$ in accordance with the frequency of the traction control carried out. That is, since the traction control is often carried out in a low fictional coefficient condition, such a snowy road, the ECU 40 corrects the fictional coefficient $\mu$ to a smaller value. On the other hand, the ECU 40 compensates the frictional coefficient $\mu$ to a larger value in a high frictional coefficient condition such as a dry pavement because the traction control is rarely carried out. The frictional coefficient $\mu$ can be obtained through a sensor for directly detecting the friction between the wheel an the road surface. Alternatively, the frictional coefficient $\mu$ obtained through anti-skid control can be employed for this purpose.

The ECU 40 judges whether or not the frictional coefficient $\mu$ is greater than a predetermined value the $\mu_0$ in step S3. When the judgment is Yes, the ECU 40 then judges whether or not the vehicle speed V based on the passive wheel speed is greater than a predetermined value $V_0$ in step S4. When the vehicle speed V is greater than the predetermined value $V_0$, the ECU 40 further judges whether or not the engine rotation speed N is greater than a predetermined value $N_0$ based on the signal from engine speed sensor 45 in step S5. When the judgment is Yes, the ECU 40 sets a first threshold value $S_{E1}$ for the engine output control as the target value $S_E$ for the engine output control and a first threshold value $S_{B1}$ for the brake force control as the target value $S_B$. In this case, the value $S_{B1}$ is smaller than the value $S_{E1}$.

Next, the ECU 40 judges whether or not the slip rate S is greater than the target value $S_B$ for the brake force control in step S7. When this judgment is Yes, the ECU 40 starts the traction control. The ECU 40 repeats the procedures in steps S8 and S9 until the conditions for stopping the traction control are satisfied in step S9. When the conditions for stopping the traction control are satisfied, for example, when it is judged that the main throttle 37 is completely closed through the first throttle sensor 46, the ECU 40 stops the traction control in step S10.

In step S7, if the judgment is No, that is, if the slip rate S is smaller than the target value $S_B$ for the brake force control, the ECU 40 judges whether or not the slip rate S is greater than the target value $S_E$ for the engine output control in step S11.

If the judgments in steps S3 through S5 are No, the ECU sets a second threshold value $S_{E2}$ as the target value $S_E$ for the engine output control and a second threshold value $S_{B2}$ as the target value $S_B$ for the brake force control. In this case, the second threshold value $S_{B2}$ is greater than the second threshold value $S_{E2}$ for the engine output control.

Figure 3:
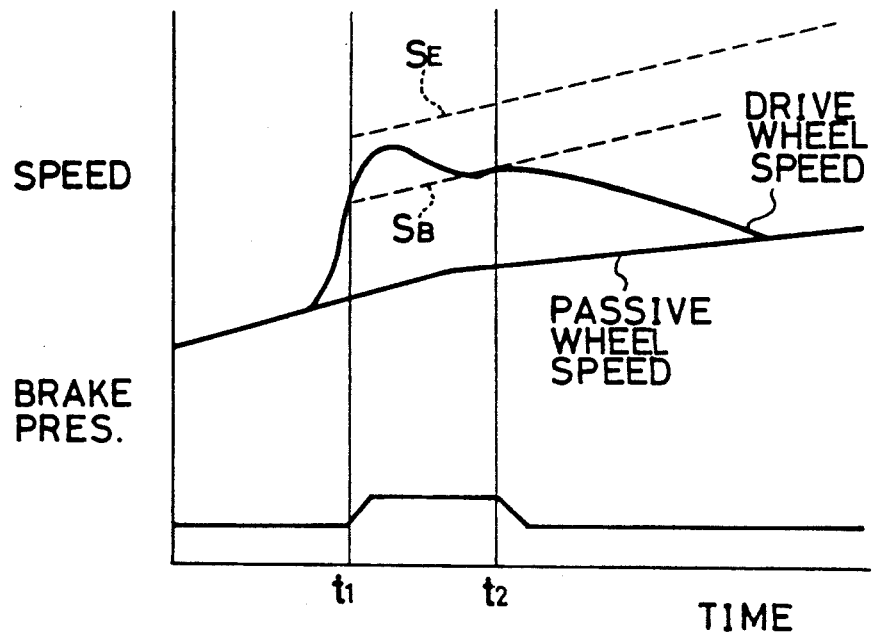
FIG. 3 and FIG. 4 are time charts showing a relationship among a wheel speed, a hydraulic pressure for braking and the throttle opening.
Figure 4:
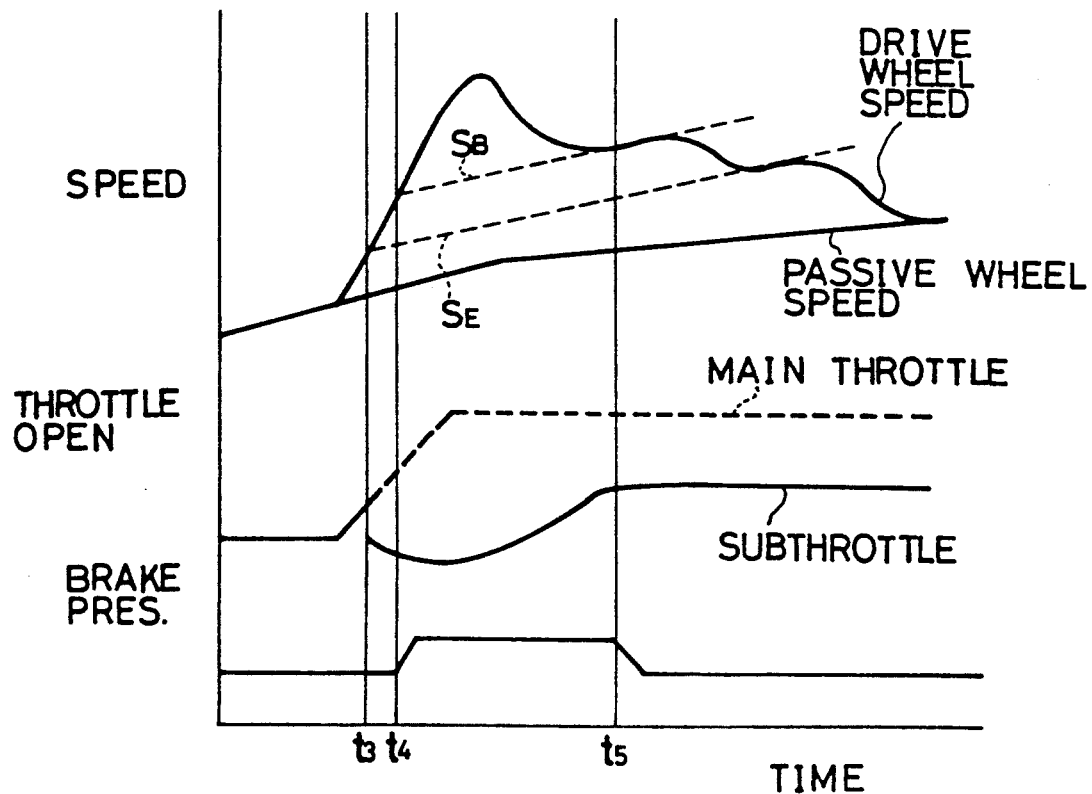

In operation, when the rear wheels 3 and 4 produces a substantial slip rate in a high friction condition wherein the target value $S_E$ for the engine output control is greater than the target value $S_B$ for the brake force control, the ECU starts the traction control to supply the hydraulic pressure to the brake devices at the time $t_1$ when the slip rate S exceeds the target value $S_B$ as shown in FIG. 3. As a result, the wheel speed of the rear wheels starts reducing. When the slip rate is reduced below the target value $S_B$ at time $t_2$, the ECU 40 stops the traction control. In this case, the engine output control is not carried out for the slip control. Thus, the engine is conditioned for exerting its full power irrespective of the slip control in the traction control.

On the other hand, when the rear wheels 3 and 4 produce a substantial slip rate in a low friction condition wherein the target value $S_E$ for the engine output control is smaller than the target value $S_B$ for the brake force control, the ECU 40 starts the traction control at time $t_3$ when the slip rate S exceeds the target value $S_E$. The ECU 40 makes a feedback control of the opening of the sub-throttle valve 39 through the actuator 38 to accomplish the target value $S_E$. If the slip rate S continues to increase irrespective of the slip control by means of the engine output control and exceeds the target value $S_B$ for the brake force control at time $t_4$, the ECU starts the brake force control for the brake devices 13, 14 of the rear wheels 3, 4. As a result, the slip control is made by both the engine output control and the brake force control after the time $t_4$. When the slip rate S is reduced below the target value $S_B$ at time $t_5$, the ECU 40 stops the slip control in the traction control so that the brake force is reduced. Thus, when the vehicle runs on the low friction road, such as a snowy road where a drive wheel tends to slip, the engine output is restricted to be reduced so that the frequency of the operation of the brake device for the slip control can be reduced. This is good for the durability of the brake system and the effect of the braking operation.

While the present invention has been explained by means of several preferred embodiments, one of ordinary skill in the art will recognize that modifications and improvements may be made while remaining within the scope and spirit of the present invention. The scope of the present invention is determined solely by the appended claims.

We claim:

1. A slip control device for a vehicle comprising:

slip detecting means for detecting a slip rate of a drive wheel, engine control means for initiating a reduction in an engine output when the slip rate exceeds a first threshold value, brake control means for initiating an application of a brake force on the drive wheel when the slip rate exceeds a second threshold value which differs from the first threshold value, only one of said engine control means and said brake control mean being initiated when the slip rate is between the first threshold value and the second threshold value, frictional coefficient detecting means for detecting a frictional coefficient of a road on which the vehicle is running, and threshold determining means for changing both the first and the second threshold values in accordance with the frictional coefficient.

2. A slip control device in accordance with claim 1 wherein the threshold determining means provides the first threshold value with a greater value than the second threshold value when the frictional coefficient is greater than a predetermined value.

3. A slip control device in accordance with claim 1 wherein the threshold determining means provides the first threshold value with a smaller value than the second threshold value when the frictional coefficient is smaller than a predetermined value.

4. A slip control device in accordance with claim 1 wherein the threshold determining means provides the first threshold value with a greater value than the second threshold value when the frictional coefficient is greater than a predetermined value, and the first threshold value with a smaller value than the second threshold value when the frictional coefficient is smaller than the predetermined value.

5. A slip control device in accordance with claim 1 wherein the engine control means controls the engine output to accomplish the first threshold value as a target value by a feedback control of a sub-throttle valve.

6. A slip control device in accordance with claim 1 wherein the brake control means controls the engine output to accomplish the second threshold value as a target value by a feedback control of a hydraulic pressure in a brake system for the drive wheel through a duty control of a solenoid valve in a hydraulic control system.

7. A slip control device for a vehicle comprising:

slip detecting means for detecting a slip rate of a drive wheel, engine control means for initiating a reduction in an engine output when the slip rate exceeds a first threshold value, brake control means for initiating an application of a brake force on the drive wheel when the slip rate exceeds a second threshold value which differs from the first threshold value, only one of said engine control means and said brake control means being initiated when the slip rate is between the first threshold value and the second threshold value, vehicle speed detecting means for detecting a vehicle speed, and threshold determining means for changing both the first an the second threshold values in accordance with the vehicle speed.

8. A slip control device in accordance with claim 7 wherein the threshold determining means provides the first threshold value with a greater value than the second threshold value when the vehicle speed is greater than a predetermined value.

9. A slip control device in accordance with claim 7 wherein the threshold determining means provides the first threshold value with a smaller value than the second threshold value when the vehicle speed is smaller than a predetermined value.

10. A slip control device in accordance with claim 7 wherein the threshold determining means provides the first threshold value with a greater value than the second threshold value when the vehicle speed is greater than a predetermined value and the first threshold value with a smaller value than the second threshold value when the vehicle speed is smaller than the predetermined value.

* * * * *